United States Patent [19]
Jacobsen et al.

[11] 4,029,579
[45] June 14, 1977

[54] METHOD AND DEVICE FOR DEWATERING OF SUSPENSIONS

[75] Inventors: Finn Jacobsen; Lennart Gustavsson, both of Karlstad, Sweden

[73] Assignee: Kamyr Aktiebolag, Karlstad, Sweden

[22] Filed: Apr. 13, 1976

[21] Appl. No.: 676,659

[30] Foreign Application Priority Data

Apr. 15, 1975 Sweden ............................ 7504310

[52] U.S. Cl. .............................. 210/77; 68/181 R; 162/251; 210/82; 210/354; 210/388; 210/391
[51] Int. Cl.² ................. B01D 33/00; B01D 35/16; D21C 9/18
[58] Field of Search .............. 162/55, 60, 251, 190; 210/77, 82, 354, 388, 391, 393, 359; 68/174, 181 R, 184

[56] References Cited
UNITED STATES PATENTS 3,348,390 10/1967 Richter ........................... 68/181 R
3,579,420 5/1971 Richter ........................ 162/251 X Primary Examiner—Robert L. Lindsay, Jr.
Assistant Examiner—Richard V. Fisher Attorney, Agent, or Firm—Cushman, Darby & Cushman

[57] ABSTRACT

A method and apparatus for dewatering a suspension of comminuted fiber material and liquid. A suspension is passed in a given direction in a container of generally circular cross-section having a hydraulic piston mounted generally concentrically therein. There are no movable components extending between the piston and the walls of the container in which it is disposed, therefore leakage from the container is minimized. The piston has screens for separating liquid from the suspension associated therewith, and is movable in the same direction as the suspension flow during removal of some liquid from the suspension, and is movable in a direction opposite to the direction of fluid flow to facilitate cleaning of the screens and to return the piston to a position wherein it can move in the direction of flow again. Liquid from the suspension is utilized for effecting the movement of the piston in both directions, and preferably the piston moves more quickly in the direction opposite to the direction of the flow of the suspension than in the direction of the flow of the suspension. Backflushing of the screens also is provided.

14 Claims, 3 Drawing Figures

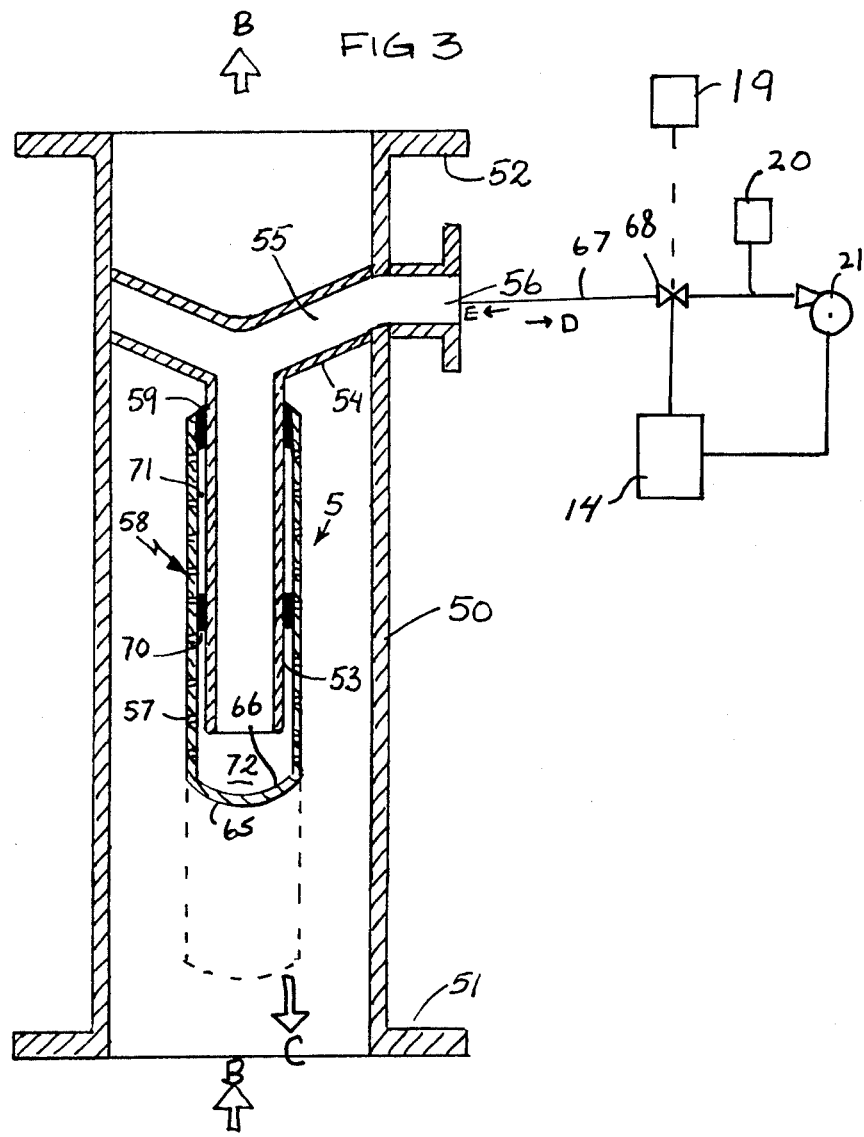

METHOD AND DEVICE FOR DEWATERING OF SUSPENSIONS

BACKGROUND AND SUMMARY OF THE INVENTION

The invention relates to an apparatus and method for dewatering the suspension of comminuted fiber material and a liquid. There are many existing prior art structures for a suspension of comminuted fiber material and a liquid, such as shown in U.S. Pat. Nos. 3,579,420 and 3,348,390. While such prior art devices are generally successful, there usually is a passageway that is movable with respect to a container through which a suspension to be dewatered flows associated therewith. This means that there is a potential for leakage of fluid from the container, which leakage, of course, is undesirable. Also, such prior art devices are relatively complicated, and rely on an outside pressure source or the like for movement of a dewatering screen, while the present invention utilizes the liquid of the suspension, and/or liquid that is removed from the suspension, for movement of a relatively simple screen moving mechanism.

According to the present invention, a dewatering apparatus is provided which includes a generally circular cross-section container through which a suspension to be dewatered flows in a given direction, a hydraulic piston mounted substantially concentrically in the container and having an interior chamber therein for transporting liquid removed from the container to an area remote from the container (i.e., reservoir), screen means mounted on the piston for allowing the passage of liquid removed from the suspension through the interior chamber of the piston to the remote area, while not allowing removal of material suspended in the suspension therethrough, means responsive to the fluid pressure of liquid from the suspension for moving the hydraulic piston relative to the container in either a first direction, corresponding to the direction of flow of fluid in the container, or a second direction opposite to the first direction, the means including a first and a second piston faces, and means for forcing liquid removed from the suspension through the piston chamber to the second piston face to move the piston in the second direction, so that no substantially dewatering takes place during movement of the piston in the second direction and so that the piston is moved to a position wherein it again may be moved in the first direction. Preferably, means are provided to insure that the piston moves more quickly in the second direction than in the first direction, so that unclogging of the screen means is facilitated during movement of the screen means in the second direction. The screen means may comprise a plurality of annular screen members having an internal chamber thereof operatively connected to a plurality of supporting arms radially extending from the piston.

According to the method of dewatering of a suspension of comminuted fiber material in a liquid, according to the present invention, the following method steps are effected: a suspension to be dewatered is passed through a container in a first direction, and a portion of the liquid from the suspension is separated out with screen means, and the separated liquid is removed from the container. A piston supporting the screen means is moved in a first direction — the direction of suspension flow — under the pressure of liquid of the suspension while separating out of a portion of the liquid from the suspension takes place, and then the separating out of liquid from the suspension is substantially terminated while the piston is moved in a second direction, opposite to the first direction, under the influence of liquid which has been separated from the suspension. Preferably, backflushing of the screen means also takes place during movement of the piston in the second direction in order to further facilitate unclogging of the screen means.

It is the primary object of the present invention to provide improved apparatus and an improved method for dewatering of a suspension of comminuted fiber material and a liquid. This and other objects of the present invention will become clear from an inspection of the detailed description of the invention, and from the appended claims.

BRIEF DESCRIPTION OF THE DRAWINGS

FIG. 3 is a sectional view of another modification of apparatus according to the present invention.

DETAILED DESCRIPTION OF THE INVENTION

Figure 1:
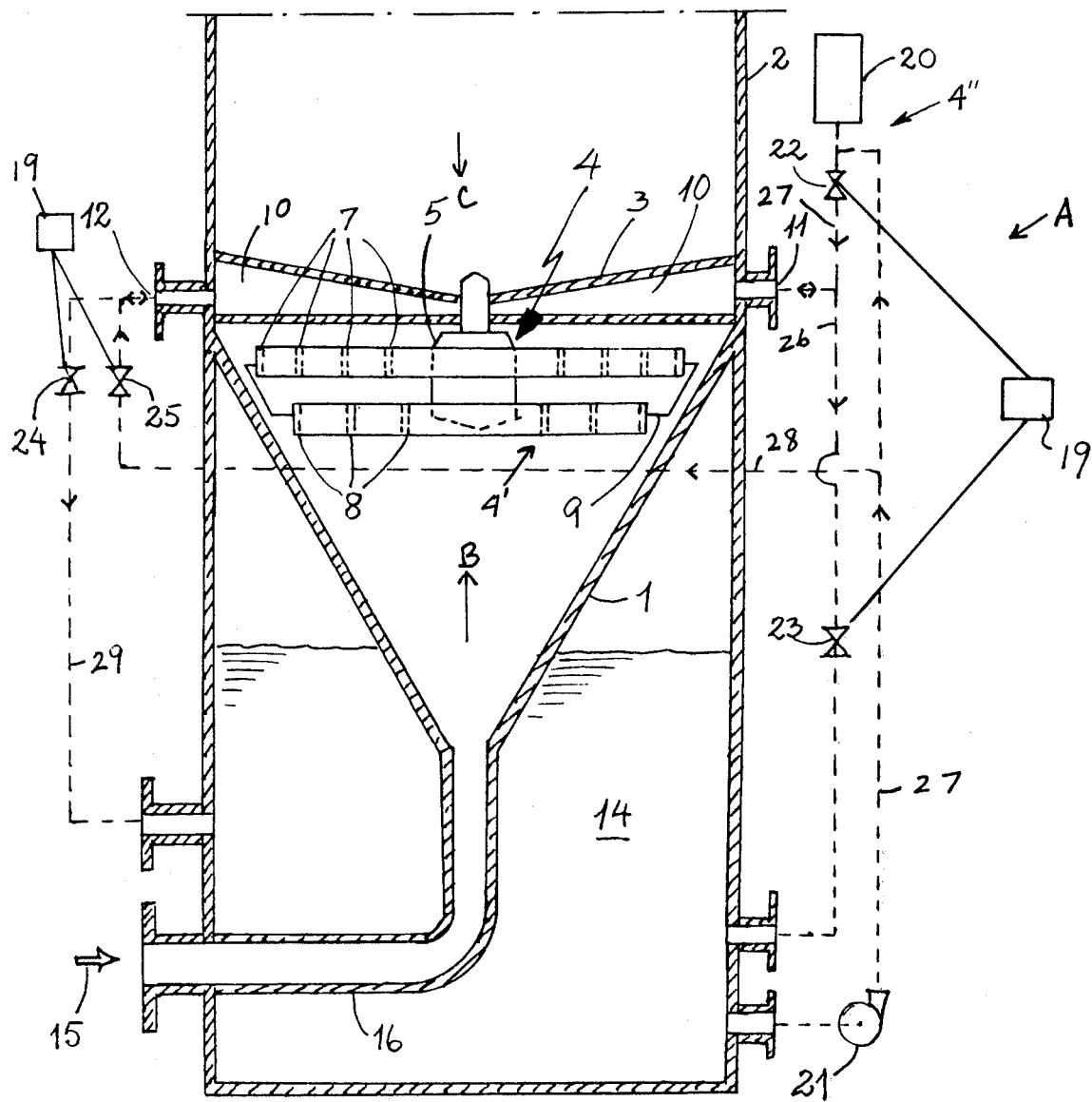
FIG. 1 is a vertical section through exemplary apparatus according to the present invention.

Exemplary apparatus according to the present invention is shown generally at A in FIG. 1. The apparatus generally comprises a container 2, having a generally circular cross-section, through which a suspension to be dewatered flows in direction B, a dewatering assembly, shown generally at 4, including a hydraulic piston 5 mounted concentrically in the container 2 and having interior chamber 33 thereof for transporting liquid removed from the container 2, to an area remote from the container, such as reservoir 14, means responsive to the fluid pressure of liquid from the suspension for moving the hydraulic piston 5 relative to the container 2 in either a first direction B, or a second direction C, opposite to the first direction B, said means including a first piston face 5' and a second piston face 5'', screen means, shown generally at 4', mounted on the piston 5 for allowing the passage of liquid removed from the suspension through the interior chamber 33 of the piston to the remote area (14) while not allowing removal of material suspended in the suspension therethrough, and means shown generally at 4'' for forcing liquid removed from the suspension through the piston chamber 33 to the second piston face 5'' to move the piston 5 in the second direction C so that unclogging of the screen means 4' is facilitated. No substantial dewatering takes place during movement of the piston 5 in the second direction C, and by movement in the second direction C the piston is again moved to a position wherein it may be moved in the first direction.

The piston 5 includes a stationary member 39 rigidly mounted to the container 2 by hollow radially extending arms 3, the arms 3 extending radially from the member 39 like the spokes of a wheel, and at least two arms 3 being provided. Each of the arms 3 has a passageway 10 therein, at least one passageway 10 communicating with an opening 11, and one passageway 10 communicating with an opening 12. An opening 35 provides communication between opening 10 and the interior chamber 33 of the piston 5 adjacent to second piston face 5'', while an opening 46 provides communication between the passageway 10 operatively connected to opening 12 with a second internal chamber 45 operatively communicating with first piston face 5'. A passageway 44 provides communication between chamber 45 and piston face 5'.

The screen means 4' preferably includes two sets of conventional annular screen members 7, 8, having interior chamber 61 formed therein. The annular screen members 7, 8 are supported by arms 9 which extend radially from the piston 5, like the spokes of a wheel. At least two arms 9 are provided, each arm having an interior chamber 30 therein. The arms are connected to a movable portion 36 of the piston 5. Seals 41 and 42 are provided between the movable piston member 36 and the stationary piston member 39. Each screen 7, 8 as shown most clearly for a screen 8 in FIG. 2, includes a horizontally extending dividing wall 62 separating chamber 61 from an upper chamber 63. A plurality of equally spaced and sized throttle openings provide controlled communication between the chambers 61 and 63 securing even liquid passage per unit length of the screen members. The chambers 63 extends upwardly into the chambers 30 of the arms 9, openings 60 being provided for providing communication between chamber 63 and chamber 30. Communication between chambers 30 and internal chamber 33 of piston 5 is provided by a plurality of openings 34. The openings 34 may be chosen so that they give a throttling action and prevent too rapid a pressure rise in either the arms 9 or the arms 3.

The reservoir 14 may be located in any suitable area remote from the container 2, however, it is convenient to provide it disposed just below conical section 1 of container 2 so that the space requirements are minimized. Inlet 15 and inlet pipe 16 pass through reservoir 14 to conical section 1 to direct the suspension into the container 2. Liquid dewatered from the suspension flowing through container 2 moves through opening 11, through outlet line 26, to reservoir 14. A conventional valve 23 is provided in line 26. Also, for providing means for forcing liquid removed from the suspension through the piston chamber 33 to the second piston face 5'' to move the piston in the second direction C a line 27 is provided extending from reservoir 14 to opening 11, the line 27 having a pump 21 and an accumulator 20 and a conventional valve 22 disposed therein. A line 28, leading from a portion of line 27 downstream of pump 21, is operatively connected to the opening 12, a conventional valve 25 being disposed in the line 28. Also, a line 29, extending directly from opening 12 to reservoir 14 is provided, a valve 24 being disposed in line 29. A common remote control means 19 preferably is provided for controlling the operation of valves 22, 23, 24, and 25.

Figure 2:
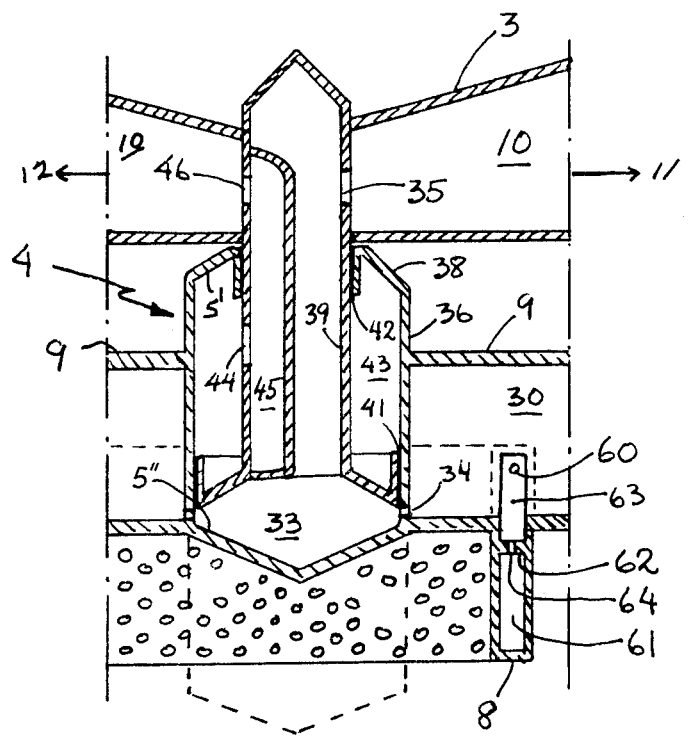
FIG. 2 is a detailed sectional view of the piston, supporting arms, and screen means of FIG. 1.

Operation of the apparatus A shown in FIGS. 1 and 2 is as follows: a suspension of comminuted fiber material and a liquid to be dewatered is passed through inlet pipes 16 into conical chamber 1 of container 2, and flows upwardly therein in direction B. The movable piston portion 36 has liquid from reservoir 14 supplied to the first piston face 5' thereof, through lines 27 and 28, under the influence of pump 21. This initiates upward movement of the piston movable portion 36 in the direction B, and during this upward movement, valve 25 is open, valve 24 is closed, valve 23 is open, and valve 22 is closed. The force of the liquid acting on first piston face 5' moves the movable member upwardly, the valve 25 being adjusted so that the movable portion 36 moves in the first direction B with substantially the same velocity as the suspension flowing in container 2 in direction B. During this upward movement, liquid flows through the openings in screens 7 and 8, into chamber 61 of the screens, through openings 64 into chamber 63, through openings 60 into chambers 30 of arms 9, and through openings 34 into the internal chamber 33 of the piston 5. From the internal chamber 33, the separated liquid flows through opening 35 into chamber 10, through opening 11 into line 26, and through the open valve 23 into the reservoir 14. Thus, dewatering is accomplished during the upward movement of the piston. When the piston movable portion 38 has reached its upward limit of travel (as by portion 38 thereof abutting arm 3) the piston 5 is ready to undergo its movement in the second direction C facilitating unclogging of the screens 7, 8.

After movement in direction B has been completed, control means 19 closes valves 23 and 25, and opens valves 22 and 24. The liquid in chamber 10 associated with opening 12 can thus flow through line 29 to the reservoir 14, while liquid under pressure from accumulator 20 is supplied through open valve 22 and line 27 to the chamber 10 communicating with internal piston chamber 33, the accumulator 20, valve 22, and line 27 comprising representative forcing means 4''. Separated liquid under pressure from accumulator 20 acts upon second piston face 5'' of internal chamber 33, and moves the assembly 4 downwardly in second direction C. Preferably, the surface area of second piston face 5'' is much larger than the area of first piston face 5' (as shown in FIG. 2) so that the downward movement of the assembly 4 is rapid relative to the movement thereof in direction B. This rapid downward movement of the assembly 4 facilitates unclogging of the screen members 8, while returning the piston 5 to a position wherein the dewatering function thereof may again be initiated. Additionally, some of the fluid flowing into internal chamber 33 flows through throttling openings 34 and into chambers 63 and 61 of screen members 7, 8, to thereby provide backflushing of the openings in the screen members 7, 8. The liquid in chamber 43 during movement of the movable member 36 in the second direction C flows through opening 44 into chamber 45 and through opening 46 into chamber 10 associated with opening 12. The degree of backflushing can be controlled by controlling the valves 22 and 24. Once the movable piston portion 36 has reached its limit of travel in the direction C, control means 19 again switches over valves 22, 23, 24, and 25 so that removal of liquid from the suspension flowing in container 2 through the screens 7, 8, again may be effected. The process is continuous, with the member 36 alternately moving in directions B and C.

The valve 23 preferably is a sequence valve, and the opening and closing thereof takes place relatively slowly. When backflushing is desired, the opening of valve 24 can be delayed relative to the opening of valve 22, and the opening of valve 22 may be in two stages.

FIG. 3 illustrates an even simpler dewatering apparatus according to the present invention. The apparatus of FIG. 3 includes a cylindrical circular cross-section housing 50, having bottom and top flanges 51 and 52 respectively, through which a suspension of comminuted fiber liquid flows in a direction B. A fixed hollow piston part 53 is provided, a communication with at least one opening 55 in a plurality of radially extending supporting arms 54, the opening 55, through connection 56, leading to a liquid reservoir 14 or the like. The movable portion of the piston 5 is shown generally at 58 in FIG. 3, and includes a cylindrical body having screen openings 57 disposed along the length thereof. Seals 59 and 70 are provided to allow relative movement of the member 58 with respect to the portion 53. First and second piston faces 65, 66, are provided respectively on cylindrical body 58. Internal chamber 71, 72 of piston 5 communicate with the opening 55 and the interior of container 50 (through screen 57). A line 67 extends from outlet 56, through valve 68 to either reservoir 14 or pump 21 an accumulator 20, the valve 68 being controlled by remote control means 19 to provide flow through line 67 in either direction D or direction E.

Operation of the device in FIG. 3 is as follows: a suspension of comminuted fiber material and liquid flows upwardly in direction B into container 50, the suspension acting on first piston face 65 of member 58 to move the member 58 upwardly in direction B from the dotted line position shown in FIG. 3 to the solid line position shown in FIG. 3. Since the movement of member 58 is controlled by the velocity of the suspension in container 50, the member 58 moves upwardly substantially with the velocity of the suspension. During movement of the member 58 in direction B, liquid passes through screen openings 57 into chamber 72, while fiber material in the suspension is prevented from passing into chamber 72. The separated liquid flows from chamber 72, through hollow member 53 through outlet 56, and into line 67. The control means 19 controls valves 68 so that it allows flow of fluid in direction D, to the reservoir 14. When the member 58 reaches its upward limit of travel in direction B, the control means 19 controls valve 68 so that flow in direction D is prevented and flow in direction E is allowed. Separated liquid under pressure of pump 21 and accumulator 20 from reservoir 14, then flows in direction E through outlet 56 into chamber 72, abutting on second piston face 66, and forces the member 58 downwardly in direction C. The pressure provided by pump 21 and accumulator 20 can be controlled so that piston 58 moves downwardly in direction C much more quickly than it moves upwardly in direction B. Once the downward limit of travel of member 58 has been reached, control means 19 again activates valve 68 to allow flow in direction D into reservoir 14 so that dewatering again takes place. During downward movement of the member 58 in direction C, under the influence of fluid flowing in direction E, some backflashing takes place, cleaning the openings in screen 57. It is apparent from an inspection of the apparatus of FIG. 3 that the movable member 58 can be made relatively light weight, and thereby the forces for initiating action thereof are relatively small.

The apparatus of FIG. 3 can be made relatively small and installed in pipe shaped containers 50 of relatively small diameter (i.e., 500 millimeters inside diameter). The "stroke" of the member 58 may be 0–100 centimeters, preferably about 20–50 centimeters. Likewise, the apparatus of FIGS. 1 and 2 may have small strokes of 0–100 centimeters, (preferably 20–50 centimeters). A plurality of devices according to the present invention may be arranged in series to provide any given amount of dewatering required. Also, while the flow of suspension in FIGS. 1 through 3 has been shown in upward direction B, the flow of suspension may be in the downward direction C suitable modification of the apparatus to accommodate the suspension movement in the downward direction being relatively simple.

As an inspection of FIGS. 1–3 makes clear, mounting means are provided for the piston 5 so that relative movement thereof with respect to the containers 2, 50 is possible while no members movable relative to the containers extend through the container walls; this is in contradistinction to the prior art (see elements 46 and 57 respectively of U.S. Pat. Nos. 3,348,390 and 3,579,420 for example).

While apparatus according to the present invention has been described primarily for dewatering of suspensions, it is also possible that washing of suspensions can be effected thereby. The addition of washed liquid can be effected by providing a plurality of movable nozzles in the pulp flow for providing radial flow of washing liquid. (See elements 70 and 83 in U.S. Pat. No. 3,524,551.) Also, with respect to the FIG. 3 embodiment, a ring chamber with nozzle openings can be provided in the housing 50. It will be seen that according to the present invention, apparatus and a method, have been provided that provide for relatively simple dewatering of a suspension. The apparatus according to the present invention always has a symmetrical force distribution, relatively little accessory equipment is necessary, and leakage and fiber losses are minimized. Backflushing can be effected to any desired degree, and the relative speeds of movement of the piston can be readily controlled. Simplified valves, such as a check valve for valve 25, may also be provided.

While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and methods.

What is claimed is:

1. Apparatus for dewatering a suspension comprising a generally circular cross-section container through which a suspension to be dewatered flows in a given direction, a hydraulic piston mounted generally concentrically in said container and having an interior chamber therein for transporting liquid removed from said container to an area remote from said container, means responsive to the fluid pressure of liquid from said suspension for moving said hydraulic piston relative to said container in either a first direction generally corresponding to the direction of flow of fluid in said container, or a second direction opposite to said first direction, said means including first and second piston faces, screen means mounted on said piston for allowing the passage of liquid removed from the suspension through the interior chamber of said piston to the remote area while not allowing removable material suspended in the suspension therethrough, and means for forcing liquid removed from said suspension through said piston chamber to said second piston face to move said piston in said second direction so that no substantial dewatering takes place during movement of said piston in said second direction and so that said piston is moved to a position wherein it may again be moved in said first direction.

2. Apparatus as recited in claim 1 wherein said first piston face has an effective area smaller than said second piston face so that said piston is moved more quickly in said second direction than in said first direction.

3. Apparatus as recited in claim 1 wherein said area remote from said container to which said liquid dewatered from said suspension in said container is removed is a reservoir, and wherein said means responsive to the fluid pressure of liquid to be dewatered to move said piston in a first direction comprises means for metering liquid to said first piston face from said reservoir during movement of said piston in said first direction but not said second direction, said means including a pump disposed in a line connecting said reservoir to a second internal chamber of said piston in operative association with said first piston face.

4. Apparatus as recited in claim 3 wherein said means for metering liquid from said reservoir to said first piston face further comprises a first valve disposed in the line operatively connecting said pump to said second internal chamber, and a second valve connected in a line leading from said line connected to said second internal chamber and said reservoir, and not including said pump, and means for selectively controlling the times of opening and closing of said first and second valves.

5. Apparatus as recited in claim 1 wherein said area remote from said container to which said liquid dewatered from said suspension in said container is removed is a reservoir, and wherein said means for forcing liquid removed from said suspension through said piston chamber to said second piston face includes a pump in a line leading from said reservoir to an accumulator, a line leading from said accumulator to said inner chamber, a third valve disposed in said line leading from said accumulator to said chamber, a line leading directly from said chamber to said reservoir, and a fourth valve disposed in said line leading from said chamber to said reservoir, and means for operatively controlling said third and fourth valves to selectively allow removal of water from said chamber to said reservoir during movement of said piston in said first direction, and for providing fluid under pressure from said accumulator to said second piston face while terminating removal of liquid from said chamber to said reservoir to move said piston in said second direction.

6. Apparatus as recited in claim 1 wherein said screen means includes a plurality of annular ring screens, having interior screen chambers mounted by hollow arm members having interior chambers thereof communicating with the hollow interior screen chambers of said annular ring screens.

7. Apparatus as recited in claim 1 wherein said screen means includes a tubular screen member terminated by a plate member which provides said first and second piston faces.

8. Apparatus as recited in claim 7 further comprising means for providing movement of said piston more quickly in said second direction than in said first direction.

9. Apparatus as recited in claim 1 wherein means are provided for mounting said piston for relative movement with respect to said container so that no members movable relative to said container extend through the walls of the container.

10. A method of dewatering a suspension of comminuted fiber material and a liquid utilizing a generally circular container, a hydraulic piston mounted concentrically in the container and having screen means for separating liquid from the suspension and being movable in either a first or a second direction, said method comprising the steps of passing a suspension to be dewatered through said container in a first direction, separating out a portion of the liquid from said suspension with said screen means and removing said separated liquid from said container, moving said piston in said first direction under the pressure of liquid of said suspension while separating out a portion of the liquid from said suspension, and substantially terminating separating out of a portion of the liquid from said suspension while moving said piston in a second direction opposite to said first direction under the influence of liquid which has been separated from said suspension, to prevent clogging of said screen means.

11. A method as recited in claim 10 wherein said first direction is substantially vertically upward, so that said suspension moves upwardly during dewatering thereof.

12. A method as recited in claim 10 wherein said piston is moved more quickly in said second direction than in said first direction.

13. A method as recited in claim 10 comprising the further step of backflushing said screen means during movement of said piston in said second direction in order to facilitate unclogging of said screen means.

14. A method as recited in claim 13 comprising the further step of throttling the liquid flow during backflushing so that pressure in said screen means does not exceed a predetermined level despite the backflushing pressure.

* * * * *